United States Patent [19]

Schwarz

[11] Patent Number: 4,760,571
[45] Date of Patent: Jul. 26, 1988

[54] RING NETWORK FOR COMMUNICATION BETWEEN ONE CHIP PROCESSORS

[76] Inventor: Siegfried Schwarz, Oberer Panorama Weg 4, D-7562 Gernsbach/Baden, Fed. Rep. of Germany

[21] Appl. No.: 758,389

[22] Filed: Jul. 24, 1985

[30] Foreign Application Priority Data

Jul. 25, 1984 [DE] Fed. Rep. of Germany ....... 3427350

[51] Int. Cl.$^4$ ............................ H04J 3/00; H04J 3/16
[52] U.S. Cl. ........................................ 370/86; 370/89; 340/825.05; 371/32
[58] Field of Search ............ 370/86, 88, 89, 85; 340/825.05, 825.5, 825.52; 375/36; 371/32, 33

[56] References Cited

U.S. PATENT DOCUMENTS

| | | | |
|---|---|---|---|
| 4,398,288 | 8/1983 | Mizokawa et al. | 370/86 |
| 4,507,777 | 3/1985 | Tucker et al. | 370/86 |
| 4,536,873 | 8/1985 | Leete | 370/86 |
| 4,583,089 | 4/1986 | Cope | 370/86 |
| 4,602,365 | 7/1986 | White et al. | 340/825.05 |
| 4,641,307 | 2/1987 | Russell | 370/85 |

*Primary Examiner*—Douglas W. Olms
*Assistant Examiner*—Frank M. Scutch, III
*Attorney, Agent, or Firm*—Dennison, Meserole, Pollack & Scheiner

[57] ABSTRACT

The present invention relates to a data transmission system having a ring network for communication between one chip processors each having a serial transmitter and serial receiver. Each one chip processor can operate as an independent local processor or as a network controller communicating via a network driver and the ring network with other one chip processors. Transmission privilege is transformed from a first one chip processor having completed transmission to the next processor in sequence which is ready for transmission, thereby reducing unnecessary waiting time.

15 Claims, 3 Drawing Sheets

RING NETWORK FOR COMMUNICATION BETWEEN ONE CHIP PROCESSORS

BACKGROUND OF THE INVENTION

The invention relates to a ring network for communication between one chip processors each having a serial transmitter and a serial receiver.

In general, there are three different types of granting transmission privilege at a network. ETHERNET uses the so-called CSMA/CD method, (carrier sense multiple access with colision detection). All processors have equal priority. ARCNET uses the so-called token passing method where transmission privilege is transferred from one processor to the next and upon loss of transmission privilege a complicated procedure is necessary to newly determine active processors. The IBM ring has data circulate in a ring and transmission privilege is transferred according to the token passing method. The known local networks and their modifications need for coupling a one chip processor at least a network controller, a line driver and sometimes a code converter and a Fifo-intermediate memory as additional IC-units. In my German Offenlegungsschriften Nos. 3313240 and 3333847 and in my U.S. patent application Ser. No. 649,372 filed on Nov. 9, 1984, I have disclosed a local network operating according to the CSMA/CD method and needing for coupling to the network a line-driver only as an additional IC-unit. The one chip processors may operate independently as a local processor and interrupt controlled as a network controller.

SUMMARY OF THE INVENTION

It is an object of the invention to provide a circuit means for enabling one chip processors having a serial transmitter and a serial receiver to operate interrupt controlled as an independent local processor or as an network controller communicating via a network driver and a ring network with other one chip processors according to the CSMA/CD and/or token-passing method.

It is a further object of the instant invention to devise a method for operating one chip processors in communication via a ring network.

It is still another object of the present invention to provide a ring network for communication between one chip processors having a simple structure and operating very flexibly.

These and other objects are achieved by a ring network for communication between one chip processors each having a serial transmitter and a serial receiver comprising:

a ring line means a plurality of network driver means one for each one chip processor and adapted each to selectively couple said transmitter and said receiver to said ring line means or to pass signals present on said ring line means when the associated one chip processor has no transmission privilege;

control means included in each of said one chip processors for selectively operating said one chip processor as an independent local data processor or as a network controller according to a predetermined priority granting method;

a tristate line means included in said network driver means and connected to said ring line means;

a timing means for each one chip processor having an input controlled to an output of said transmitter of the associated one chip processor and adapted to be triggered by a start bit generated by said transmitter enabling a first tristate line driver to pass serial data words from said transmitter to said ring line means and to block passing of said signals present on said ring line means.

With a preferred embodiment of the present invention, the signals arriving on the ring-line means are amplified by an amplifier and supplied to the receiver of the associated one chip processor and a noise filter comprising a further amplifier, a resistor, and a capacitor and suppressing noise by feedback and delaying the arriving signals before applying them to a second tri-state line driver which connects those signals to the ring line whenever the transmitter of the one chip processor is not triggered active by a monoflop. If the monoflop is triggered by a start bit of the transmitter serial data words following a start bit are connected to the first tristate line driver enabled by the monoflop which now transmits the data words to the ring line instead of the tristate line driver. Upon a drop of the supply voltage of the network driver below a predetermined value the two tristate line drivers are switched into a tristate operating mode by a supply voltage detector and the network driver is shunted preferably by depletion FET-transistors or a relay and the termination resistor of the ring line is disconnected preferably by an enhancement FET-transistor in order to avoid unnecessary attenuation. Transfer of transmission privilege with a loaded ring network is accomplished by the one chip processor having completed its data transmission resetting a transmission privilege bit or flag and tranferring transmission privilege by issuing a certain information preferably address 255 to all other one chip processors announcing that transmission privilege is to be granted in the next data byte 255 which announcement is received by all one chip processors via the associated network drivers and the ring network. In contrast, the following data byte 255 which actually transfers transmission privilege thus passes to said one chip processor ready for transmission and next in sequence in the ring network only, whilst other one chip processors ready for transmission upon receipt of the address 255, transmit an own next data byte 00 in sychronism to the address 255 in order to prevent recirculation of the data byte 255 from the first one chip processor for a further transfer of the transmission privilege within the ring network by the network drivers associated to the one chip processors. Thus only that one chip processor next in sequence with its set transmission request flag receives transmission privilege in response of the data byte 255, now resetting its transmission request flag and setting its transmission privilege flag. Thus, a next data transmission of this one chip processor is initiated. Any other one chip processor not ready for transmission i.e. having its transmission request flag reset will not get transmission privilege though receiving data byte 255. If none of the one chip processors takes over the transmission privilege, there will be a tansmission pause unless the first one chip processor is alternatively programmed such that it cyclically offers the transfer of the transmission privilege until one of the other one chip processors takes over that transmission privilege.

In order to achieve an optimum data throughput in the ring network granting of the transmission privilege may be oriented at the load of the ring network. In this connection, the ring network resumes its transmission activity upon initial start of operation or upon a transmission pause according to the CSMA/CD method. All one chip processors then have the same priority. If there is a transmission request by one or several of the one chip processors before completion of a current data transmission at the ring network, the transfer of transmission privilege is now accomplished according to the token passing method in that said one chip processor having transmission privilege transfer the transmission privilege to that one chip processor which is next in sequence in the ring network and ready for transmission. The token passing method is applied as long as the ring network is loaded whilst transmission privilege granting is changed to the CSMA/CD procedure after unloading of the ring network.

One of the salient advantages of the present inventions resides in the fact that for connecting one chip processors to a ring network, only a network driver is necessary as an external IC-unit. In view of the unidirectional data transmission within the ring network and the refreshing of the signals at each one chip processor connection point the distance of transmision is increased and it is possible to use optical transmission lines.

DESCRIPTION OF A PREFERRED EMBODIMENT OF THE INVENTION

Figure 1:
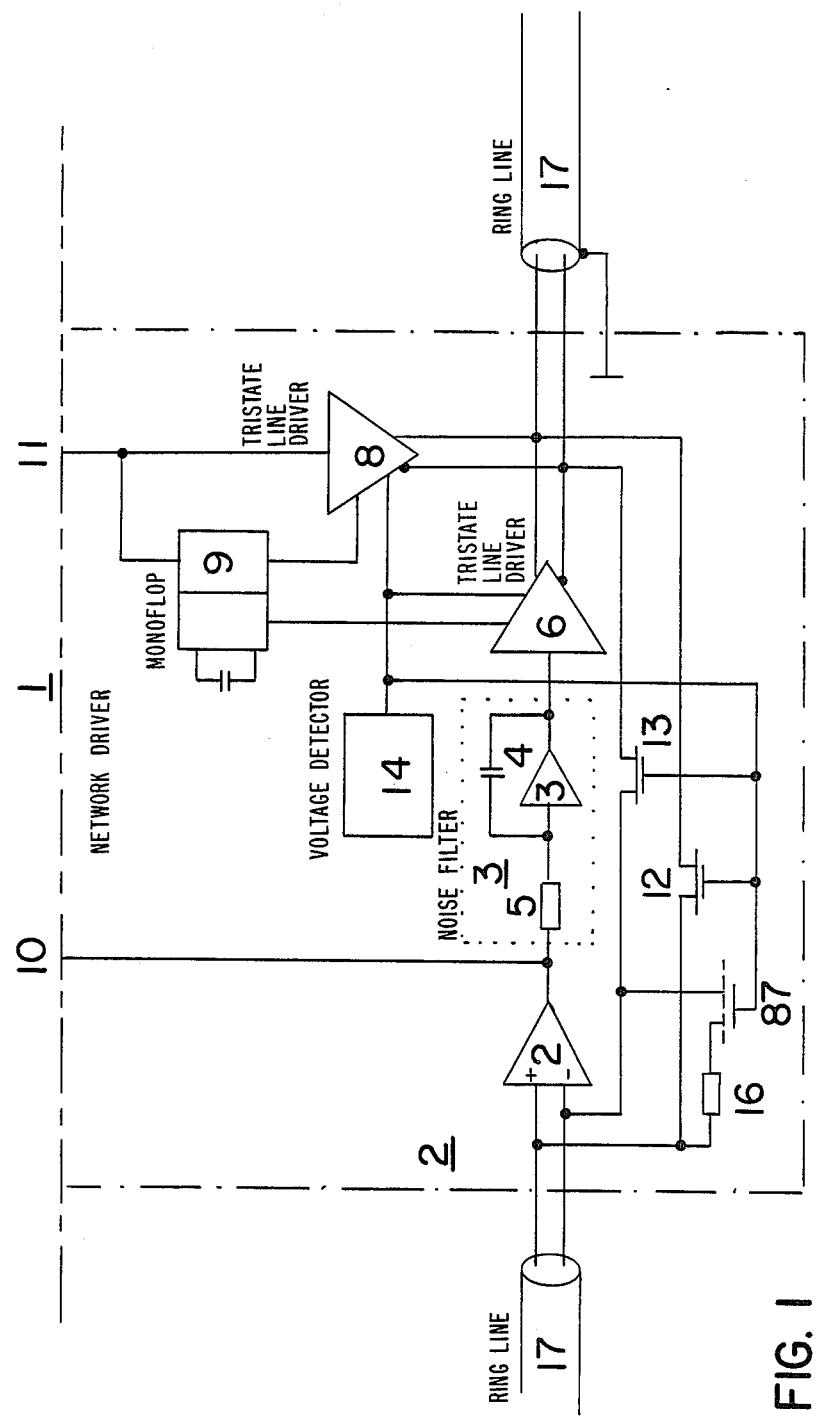
FIG. 1 shows a block diagram of a network driver used in connection with a preferred embodiment of the ring network according to the present invention

Each participant of the ring network FIG. 1 consists of four units, a one chip processor 1, the driver 2 and means, preferably for instance a program, for operating the one chip processor according to the rules of the CSMA/CD- and all token passing methods. The one chip processor may be anyone of the known processors in particular one of the processor families 8044, 8051, 8096 of INTEL, 6801 of Motorola, 6500/11 or 6500/13 of Rockwell, or 68200 of Mostek. The one chip processors are programmed such that they are able to operate interrupt controlled as network controllers but also fulfill the function of a local computer.

Data transmission within the ring network is unidirectional, i.e. each bus 17 connects the serially operating transmitter of the one chip processor 20 to the serially operating receiver of the one chip processor 21 etc. In each network connection i.e. in each network driver 32;37 (FIG. 2) the serial message will be refreshed. Thus the ring network admits a data transmission through a large distance via coaxial-, Twinax- and light transmission lines. Preferably data transmission is performed in a NRZ- NRZI- or biphase code.

The two functions of the network driver 2 are to connect its associated one chip processor 1 to the busses 17 and to close the busses 17 to a ring. The network driver connects the network connections even then when none of the one chip processors is ready for transmission or the power supply for individual network drivers is down. In detail, signals arriving on the ring bus 17 are amplified by amplifier 2 and are then connected to a noise filter 3 for suppressing noise and delaying the signals by a predetermined delay before supplying them to a tristate bus driver 6 which applies the signals to the next part of the ring bus 17 thus closing the connections of the ring network. Without any transmissions this ring is completely closed. The noise filter 3 comprises an amplifier 3' shunted by a capacitor 4 and having its input series connected to a resistor 5.

The network driver 2 connects the ring bus 17 through the amplifier 2 to the serial receiver 10 of the one chip processor 1 such that the latter may "listen" into the ring network at any time. Transmission from the one chip processor 1 is accomplished as disclosed in my Greman Offenlegungsschrift No. 33 13 240.2. Any start bit logic 0 of a serial data byte outputted by the transmitter 11 triggers monoflop 9 which enables the tristate bus driver 8 connecting the transmitter 11 of the one chip processor 1 to ring bus 17 for the time of a data word or byte and a subsequent pause.

During this time the tristate bus driver 6 is switched to the tristate mode by monoflop 9. Hence the one chip processor 1 in particular its transmitter 11 is connected to the ring network. The one chip processor 1 solely determines by its serial transmitter 11 which of the two rings are closed. This is accomplished by alternately switching either of the two bus drivers 6 and 8, respectively, to the tristate mode by the monoflop 9.

The network driver 2 further includes a supply voltage detector 14 which switches both the bus drivers 6 and 8 into the tristate mode upon a drop of the operating voltage below a critical value. In order to maintain the ring network operative despite the dropout of one network driver the supply voltage detector 14 connects the two opposite portions of ring bus 17 by the depletion-FET-transistors 12 and 13 and disconnects the termination resistor 16 by cutting off the enhancement-FET-transistor 87 in order to avoid any unnecessary attenuation. This through connection of ring bus 17 and the disconnection of termination resistor 16 may alternatively be accomplished by an external relay controlled by a supply voltage detector 14.

Figure 2:
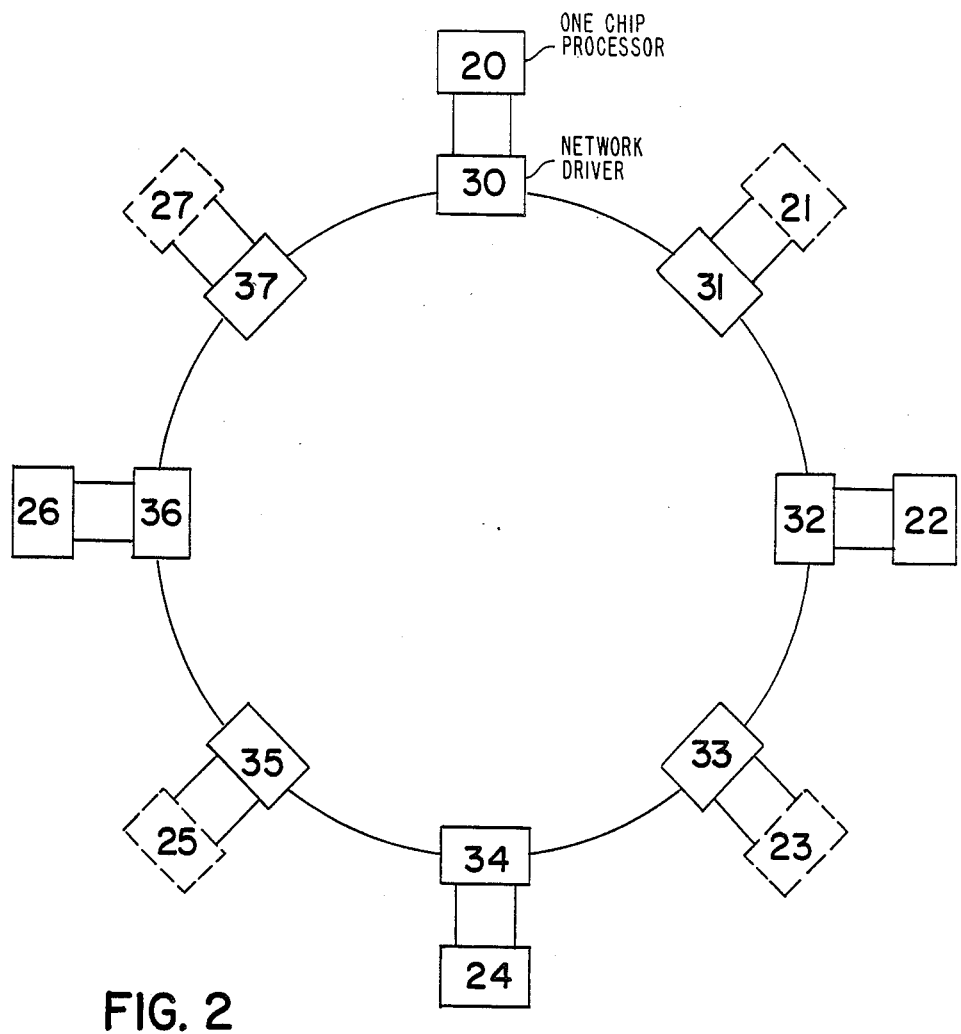
FIG. 2 is a diagram for explaining the transfer of the transmission privilege and FIG. 3 shows the protocol as applicable for the ring network according to the present invention.

According to an important feature of the present invention the transfer of the transmission privilege of an active one chip processor 20 when the network is loaded according to FIG. 2 is accomplished by use of the token passing method. This requires an indication asking the other one chip processors 21 to 27 to take over the transmission privilege. Since only the subsequent one chip processor 22 ready for transmission should take over the transmission privilege, the one chip processor 22 must remove the indication which requests taking over of the transmission privilege from the following one chip processors 23–27. For this purpose the indication or flag for transfer of the transmission privilege must be stored and must be removed in an additional operating time. This would lead to an increase in operating time of the network driver 2 resulting in a considerable reduction in transfer rate if the indication or flag were to be removed before leaving the network driver. In order to avoid this processing step one chip processor 20 according to FIG. 2 transferring the transmission privilege transmits two characters successively, for instance the address 255 which announces to all chip processors 20 to 27 in the token ring network that the transmisson privilege will be newly assigned in connection with the next data byte 255. Thereupon one chip processor 20 cancels its own transmission privilege flag, since its data transmission has been completed. That announcement, i.e. the address 255 is received by all one chip processors 20 to 27 connected to the token ring network via the network drivers 31 to 37. Not all one chip processors 20 to 27 receive via their network drivers 31 to 37 the subsequent data byte 255 since the one chip processors 22, 24, 26, which are ready for transmission, upon receipt of the address 255 in synchonism therewith transmit automatically an individual different, subsequent data byte, for instance 00 in order to block the passing of the data byte 255 via the network drivers 32, 34, 36 from the one chip processor 20 in the ring network. Amongst the one chip processors 22, 24, 26, ready for transmission by this manipulation only one chip processor 22 next to processor 20 receives by data byte 255 transmission privilege in view of its transmission request flag SET which all results in clearing the transmission request flag and setting the transmission privilege flag. Thus data transmission from one chip processor 22 initiated earlier is started. One chip processor 21 also receives data byte 255, but since its transmission request bit is not set it is skipped in granting transmission privilege. In case that none of the one chip processors 20 to 27 takes over the transmission privilege, a transmission pause is introduced unless one chip processor 20 is not programmed such that it cyclically offers the granting of the transmission privilege until one of the one chip processors 20 to 27 takes over the transmission privilege.

With loaded network, transmission privilege is transferred according to the token passing method. Thus the transmission privilege is not just transferred to the next processor independent whether it is ready for sending or not as it is done with known networks. The ring network according to the invention transfers the transmission privilege only to another one chip processor when it is ready for transmission. Therefore unnecessary waiting times are avoided.

If the one chip processor 21 were to send, at first its transmission request flag is set. With the network loaded upon each announcement of transfer of the transmission privilege it is checked whether this one chip processor 21 is the next to follow. If this is the case, the transmission request of this one chip processor 21 is initiated long before it is executed.

During a transmission pause of the network that or those one chip processor(s) which are to send, try to gain access to the network with equal priorities according to the CSME/CD method. This is accomplished by a ring bus free check by the one chip processor(s). Access is gained statistically and timely varied by the various one chip processors. Upon a transmission collision between two or more one chip processors they start again to check the ring bus for condition "free". As soon as one of the one chip processors has got access to the ring network without collision its transmission request flag is reset and its transmission privilege flag is set, thus it gains priority over all other one chip processors in the network until completion of its transmission activity.

Those one chip processors probably competing with that having gained access to the ring network receive their transmission privilege in accordance with the transferring thereof at loaded network according to the rules of the token passing method one after the other. A transmission collision is detected within the ring network even without a collision detector since the one chip processor receives the data byte transmitted along the ring network. If there is no coincidence between the received data byte and the transmitted data byte with an equal priority access of one or several one chip processors there must be a transmission collision.

The protocol of the ring network according to the invention corresponds to that of the German Offenlegungsschrift No. 33 33 847.7. According to FIG. 3a it comprises the following successive information: destination address 40, source address 41, command 42, receiving address 43, sending address 44, number of data bytes 45. Data bytes and their check sums, check sum of the identification 47. Data bytes in portions 47 for 15 data byte, check sum 46 of the foregoing data portions and the stop bite 48.

42 informs the transmitter and the receiver(s) whether the addresses of the transmitter and the receiver(s) are valid for the internal or external data memory and whether there should follow an acknowledgement of received data or a data response, the transmission privilege of acknowledgement or response being transferred to the receiver by three bit of the command and being returned to the requesting transmitter upon completion of the data transmission.

Figure 3:
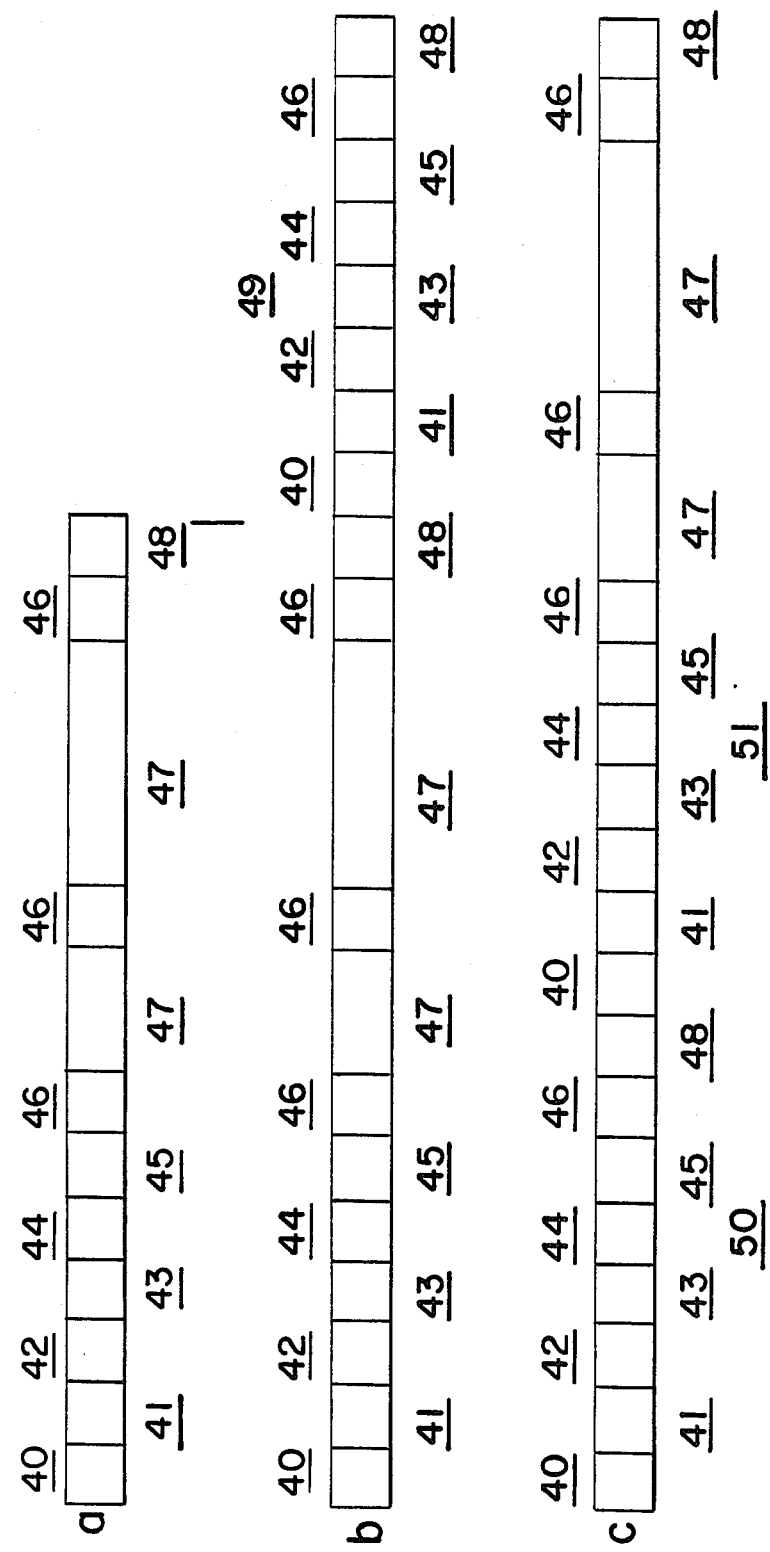

FIG. 3a shows the protocol without acknowledgement or response. FIG. 3b shows the protocol of the data transmission of FIG. 3a with an edit mark or character for the acknowledgement of the receiver 49. The acknowledgement is accomplished by the next receiving address or the first transmission address. With a data response according to FIG. 3c the receiver is requested by the marks or characters of the transmitter 50 to transmit data to the requesting transmitter. Data message of the receiver 51 is added to the request of the transmitter 50.

Data protection is accomplished by check sums transmitted subsequent to the marks or characters and data portions. The transmitter adds the characters and/or data and transmits check sums if the remaining number of data bytes to be transmitted yet corresponds to the value X0 H. The receiver is adding up the received characters and/or data and is checking up to the remaining number X0 H whether the check sum of the data received corresponds to the received check sum. If there is no accordance of the check sums, for instance a byte incremented by 1 will be returned to the transmitter instead of the received byte. With a broadcast transmission characterized by destination address 0 the receiver(s) neither return to the transmitter the received byte nor a collision byte.

As regards transmission errors, these are detected by the transmitter since the received bytes are compared to the transmitted ones. Detecting a transmission error, the transmitter tries to correct it. This is done by resetting and starting a new transmission request resulting in a transmission of the updated new identification and the repetition of the last data portion; for safety reasons and due to the admissable bus length at least the last 8 bytes will be repeated. The receiver is waiting for the transmitter to restart the data transmission anew.

If the network controller in the one chip processor is implemented in hardware rather than software the serial data transmission rate is no more dependent on the processing rate of the one chip processor and may be increased. Furthermore the data transmission to the internal and external memories may be performed by DMA access without any effect on the ring network by the one chip processor.

It should be noted that the delay introduced by the noise filter 3 for the signals on the ring line is chosen such that the one chip processor 20 as a mark for transferring transmission privilege uses the address 255 only and suppresses by means of the tristate line driver 8 of the network driver 32 the address designation bit of the address 255 for the subsequent one chip processors 24, 26, which are ready for transmission before that address designation bit leaves the network driver 32 via the tristate line driver 6.

Network driver 2 may be a separate IC unit but preferably it is integrated into the one chip processor 1.

What is claimed is:

1. A ring network for communication between one chip processors each having a serial transmitter and a serial receiver comprising:
   a ring line means;
   a plurality of network driver means, one for each one chip processor and adapted each to selectively couple said transmitter or said receiver to said ring line means or to pass signals present on said ring line means when the associated one chip processor has no transmission privilege;
   control means included in each of said one chip processors for selectively operating said one chip processor as an independent local data processor and selectively as a network controller according to a predetermined priority granting method;
   a first and second tristate line driver included in said network driver means and connected to said ring line means;
   a timing means for each one chip processor having an input connected to an output of said transmitter of the associated one chip processor and adapted to be triggered by a start bit generated by said transmitter enabling said first tristate line driver to pass serial data from said transmitter to said ring line means and said second tristate line driver to block passing of said signals present on said ring line means.

2. The ring network of claim 1 wherein said second tristate line driver passes said signals present on said ring line means when said timing means is inoperative.

3. The ring network of claim 1 further comprising a supply voltage detector means for issuing a blocking signal when detecting an excess supply voltage drop, said signal blocking said first tristate line driver and shunting said network driver means associated thereto for passing said signals present on said ring line means essentially without attenuation.

4. The ring network of claim 1 wherein said network driver means include an amplifier having inputs connected in series to said ring line means and an output connected to said receiver and to an input of a noise removing means having its output connected to an input of said second tristate line driver an output of which is connected in series to said ring line means.

5. The ring network of claim 4 wherein said noise removing means comprise the series connection of a resistor and an amplifier the latter being shunted by a capacitor.

6. The ring network of claim 1, wherein said timing means is a monoflop.

7. The ring network of claim 3, wherein said network driver means is shunted via switching means operable by said blocking signal generated by said supply voltage detector means.

8. The ring network of claim 7, wherein said switching means are FET-Transistors.

9. The ring network of claim 1, wherein said priority granting method is a CSMA/CD method.

10. The ring network of claim 1, wherein said priority granting method is a token passing method.

11. The ring network of claim 1, wherein said priority granting method is a combination of the CSMA/CD and the token passing methods.

12. The ring network of claim 1, wherein said control means of an associated one chip processor causes the latter upon completion of the data transmission to transfer its transmission privilege to that of said one chip processors ready for transmission and being next in electrical sequence to said first one chip processor.

13. The ring network of claim 12, wherein for a transfer of said transmission privilege from a one chip processor the latter first transmits an announcement received by all one chip processors whilst the information following the announcement is received by the next following one chip processor only ready for transmission request and which blocks the further transfer of said information to any others of said one chip processors.

14. The ring network of claim 13, wherein upon receipt of said information by said next following one chip processor a transmission request flag is reset whilst a transmission privilege flag is set.

15. A method of operating a ring network for communication between a plurality of one chip processors comprising the steps of:
   establishing a ring line means;
   providing a plurality of network driver means, one for each of said one chip processors to selectively couple each one chip processor to said ring line means;
   operating each said one chip processor as a network controller to communicate with any other one chip processor via said network driver means and said ring line means;
   operating said network controllers for transferring transmission privilege from a first one chip processor upon completion of transmission to that said one chip processor ready for transmission and being next in electrical sequence to said first one chip processor;
   and wherein data transmitted by one of said one chip processors are subdivided into blocks individually checked by the receiving one chip processor returning an error signal to said transmitting one chip processor in case of an error in the received data, the transmitting one chip processor retransmitting that block of data only containing the error before continuing transmission.

* * * * *